United States Patent [19]
Kronberg

[11] Patent Number: 5,405,588
[45] Date of Patent: Apr. 11, 1995

[54] PROCESS FOR REMOVING CADMIUM FROM SCRAP METAL

[75] Inventor: James W. Kronberg, Aiken, S.C.

[73] Assignee: The United States of America as represented by the United States Department of Energy, Washington, D.C.

[21] Appl. No.: 276,721

[22] Filed: Jul. 11, 1994

[51] Int. Cl.$^6$ .................. C01G 1/12; C01G 11/02
[52] U.S. Cl. ............................. 423/1; 106/452; 423/101; 423/105; 423/109; 423/566.1
[58] Field of Search ............... 423/1, 99, 101, 566.1, 423/105, 109; 106/452

[56] References Cited

U.S. PATENT DOCUMENTS

| | | | |
|---|---|---|---|
| 921,312 | 5/1909 | Thwaites | 423/105 |
| 1,686,391 | 10/1928 | Muller et al. | 423/101 |
| 1,780,323 | 11/1930 | Waring | 75/724 |
| 2,837,406 | 6/1958 | Schaufelberger | 423/105 |
| 2,912,305 | 11/1959 | Wagner | 423/105 |
| 3,258,307 | 6/1966 | George | 423/105 |
| 3,721,729 | 3/1973 | Schulte-Schrepping | 423/105 |
| 3,853,981 | 12/1974 | Hadzeriga | 423/24 |
| 4,053,553 | 10/1977 | Reinhardt et al. | 423/105 |
| 4,133,865 | 1/1979 | Calbeck | 423/106 |
| 4,383,979 | 5/1983 | Rastas et al. | 423/36 |
| 4,405,570 | 9/1983 | Van Der Meulen et al. | 423/566.1 |
| 4,503,017 | 3/1985 | Gadd et al. | 423/101 |
| 4,610,722 | 9/1986 | Duyvesteyn et al. | 423/101 |
| 4,762,692 | 8/1988 | Beltz et al. | 423/101 |
| 5,068,094 | 11/1991 | Frankenfeld et al. | 423/109 |

FOREIGN PATENT DOCUMENTS

| | | | |
|---|---|---|---|
| 288622 | 4/1991 | Germany | 423/101 |
| 295399 | 10/1991 | Germany | 423/105 |
| 191063 | 10/1984 | Japan | 423/566.1 |
| 215885 | 7/1958 | United Kingdom | 423/105 |
| 1143791 | 2/1969 | United Kingdom | 423/105 |
| 2097370 | 11/1982 | United Kingdom | 423/566.1 |

Primary Examiner—Wayne Langel
Attorney, Agent, or Firm—Brian R. Tumm; Harold M. Dixon; William R. Moser

[57] ABSTRACT

A process for the recovery of a metal, in particular, cadmium contained in scrap, in a stable form. The process comprises the steps of mixing the cadmium-containing scrap with an ammonium carbonate solution, preferably at least a stoichiometric amount of ammonium carbonate, and/or free ammonia, and an oxidizing agent to form a first mixture so that the cadmium will react with the ammonium carbonate to form a water-soluble ammine complex; evaporating the first mixture so that ammine complex dissociates from the first mixture leaving carbonate ions to react with the cadmium and form a second mixture that includes cadmium carbonate; optionally adding water to the second mixture to form a third mixture; adjusting the pH of the third mixture to the acid range whereby the cadmium carbonate will dissolve; and adding at least a stoichiometric amount of sulfide, preferably in the form of hydrogen sulfide or an aqueous ammonium sulfide solution, to the third mixture to precipitate cadmium sulfide. This mixture of sulfide is then preferably digested by heating to facilitate precipitation of large particles of cadmium sulfide. The scrap may be divided by shredding or breaking up to expose additional surface area. Finally, the precipitated cadmium sulfide can be mixed with glass formers and vitrified for permanent disposal.

15 Claims, 1 Drawing Sheet

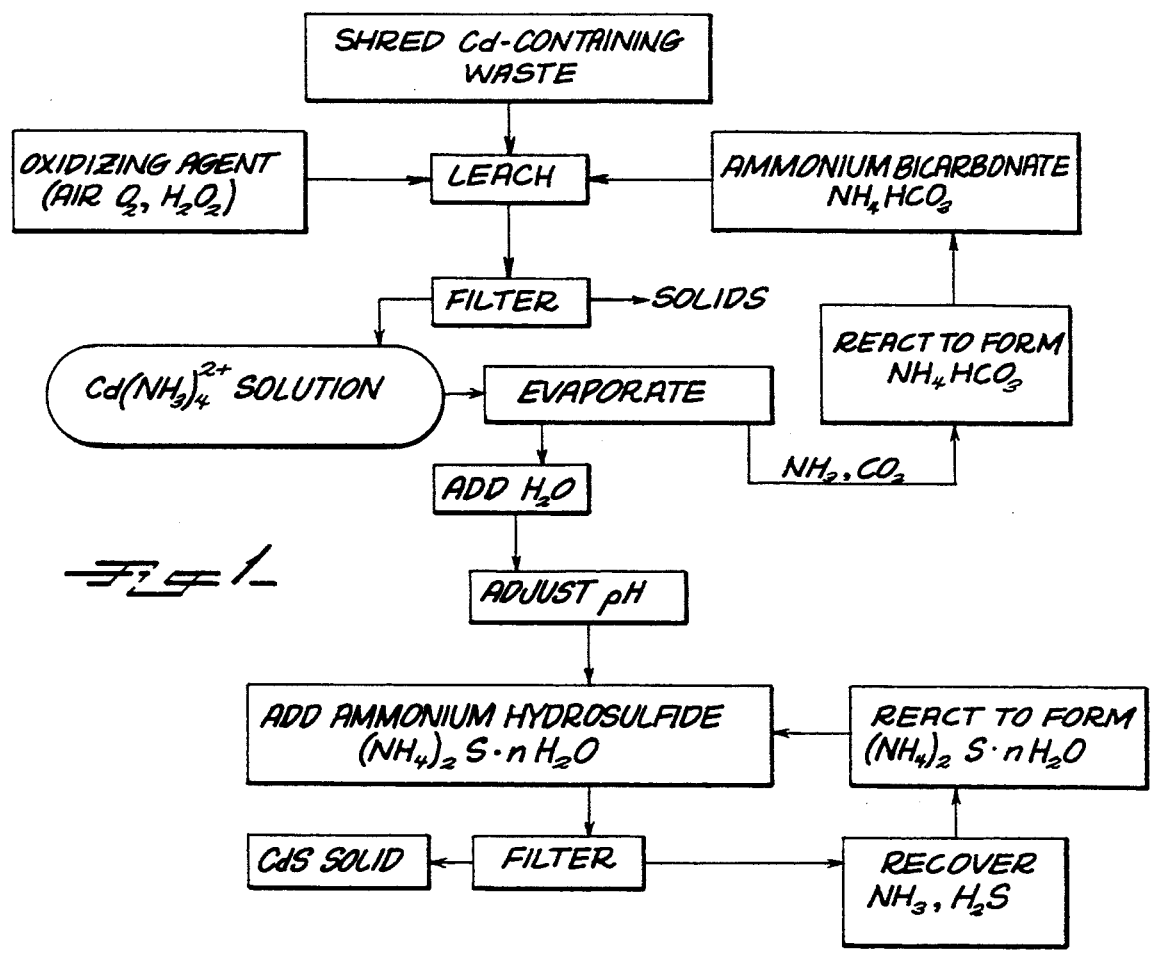
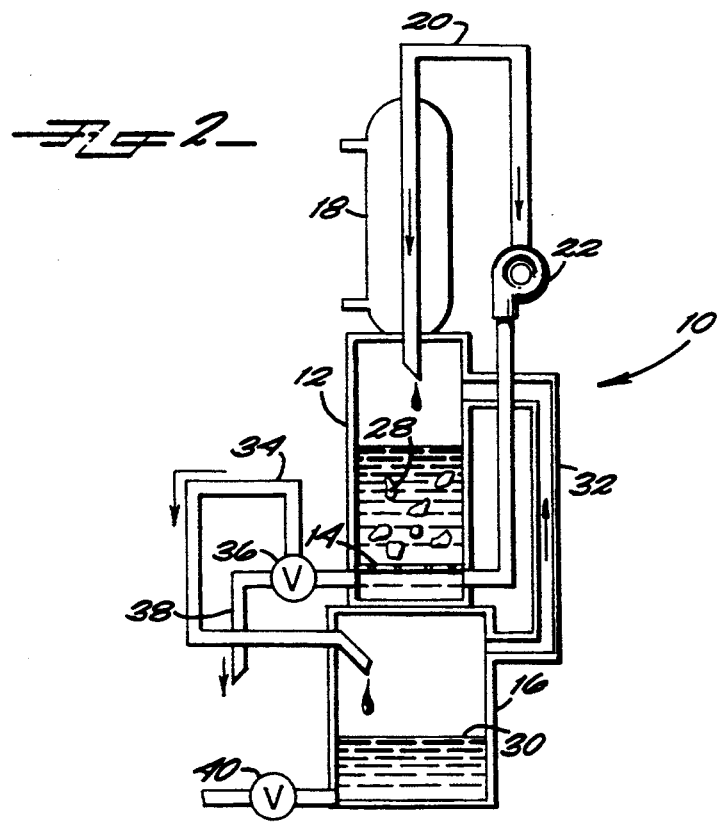

PROCESS FOR REMOVING CADMIUM FROM SCRAP METAL

The United States Government has rights in this invention pursuant to Contract No. DE-AC0989SR18035 between the U.S. Department of Energy and Westinghouse Savannah River Company.

BACKGROUND OF THE INVENTION

1. Field of the Invention

The present invention relates to a method for recovering cadmium from cadmium-containing scrap metal. In particular, the present invention relates to a method for recovering cadmium from scrap metal and converting it to a nonleachable form.

2. Discussion of Background

Cadmium is a rare metal, roughly as plentiful as silver in the Earth's crust. It is found chiefly as an impurity in zinc ores, although one primary cadmium mineral, greenockite (cadmium sulfide, CdS) occurs in some hydrothermal ore bodies. Cadmium has physical and chemical properties intermediate between those of zinc and mercury.

Cadmium's unusual properties have historically made it a valuable ingredient in metallurgy. Low-melting solders, and fusible metals used in fire and steam safety, frequently contain cadmium; a well-known example is "Wood's metal," an alloy made by combining one part each of tin and cadmium with two pans lead and four parts bismuth. Cadmium is used in coating iron and steel to protect them from corrosion; it functions in this role much like zinc on galvanized iron, but is far more effective on a weight-for-weight basis. Cadmium is also used in the contacts of electrical relays meant to handle high currents—any relay rated for ten amperes or more likely has cadmium-bearing contacts.

The ready oxidizability and reducibility of cadmium (as evidenced by its low reduction potential of $-0.4026$ V) makes it useful in energy storage, notably in rechargeable nickel-cadmium cells. Cadmium is also used as an additive to improve the performance of lead-acid storage cells, especially in restoring old cells which have lost some of their capacity.

An additional property of cadmium—or more accurately of its isotope cadmium-113 which makes up 12.2% of naturally-occurring cadmium—is that it has an unusually high absorption cross-section for thermal neutrons. As a result, cadmium metal is widely used in nuclear reactor control and safety rods, housings and shielding assemblies for thermal-neutron sources and measuring equipment, and various other devices used throughout the nuclear industry.

Because of these multiple uses, cadmium is present to some degree in scrap metal from a wide variety of sources.

Cadmium is readily absorbed by the human body from food or water, but is much less readily excreted, and so becomes concentrated to a high degree in some body tissues. Like mercury, cadmium is highly toxic to humans, typically affecting the kidneys, bones, liver and nervous system. Inhaling fumes of the metal or freshly-formed oxide can cause lung scarring, pneumonia, emphysema, or even death. As a result, it is listed as a characteristic hazardous waste with a T.C.L.P. limit of only one part per million. This means that to be considered as nonhazardous waste, any cadmium-beating waste must be in such a form that, after leaching by simulated groundwater in an EPA-specified laboratory procedure, the water will contain less than one part per million of dissolved cadmium.

The volatility of cadmium, combined with its toxicity, makes cadmium-bearing scrap difficult and often impractical to reprocess. Nearly all scrap metal reclamation schemes use heat to bum off grease, paint and other contaminants. Heat may also be applied to melt the metal into more compact, easily-handled forms such as ingots, or disperse it into granules for more efficient chemical processing. When cadmium-bearing scrap is heated, the cadmium vaporizes, forms fine particles suspended in the air, and can poison anyone who breathes in the particles. As a result, it is often preferable to discard known cadmium-bearing scrap metal, treating it as hazardous waste, rather than to attempt to reuse it.

Like zinc and mercury, cadmium is almost inert to pure water but readily attacked by some dissolved species, particularly those which can form stable, water-soluble complexes with the cadmium ion. Ammonium compounds have a disproportionate effect because of the easy formation, high solubility and great stability of the cadmium tetrammine ion, formed by the reaction $Cd^{2+} + 4NH_3 \rightarrow Cd(NH_3)_4^{2+}$. Cadmium dissolution is accelerated if oxygen or another oxidizing agent is present. Since ammonium compounds and oxygen are naturally present in rain and in most groundwater, cadmium-beating scrap which is buffed or exposed to the weather will tend to release cadmium to the environment in the form of soluble tetrammine salts. Like the metal and its uncomplexed ions, cadmium tetrammine salts are highly toxic. Hence, most cadmium-beating scrap requires special handling and disposal as toxic waste.

A special problem arises when waste is above the T.C.L.P. limit for a characteristic waste and is also radioactive. Such material is termed "mixed waste." Disposal of mixed waste is extremely difficult because of the conflicting regulations governing toxic and radioactive wastes. Much nuclear scrap, such as used reactor control and safety rods, must be handled as mixed waste because it contains not only cadmium but also residual amounts of radioactivity from neutron irradiation.

A number of processes are available for recovering metals, including cadmium, from acid solutions. Frankenfeld, et al. (U.S. Pat. No. 5,068,094) treat Cd-containing wet process phosphoric acid with a solution containing an amine or quaternary ammonium salt in an organic solvent, preferably a solution containing anionic chlorocomplexes of one or several polyvalent metals different from Cd. The Cd ions displace the polyvalent metal ions from the chlorocomplex salts, and may be recovered in the form of $CdCl_2$ crystals. Rastas, et al. (U.S. Pat. No. 4,383,979) remove Zn, Cu and Cd from ferrites by leaching with sulfuric acid to produce ferritic solids and a sulfate solution of the nonferrous metals, and separating the solids from the sulfate solution. The invention is directed at optimizing the particle size of the solids. Calbeck (U.S. Pat. No. 4,133,865) prepares metallic sulfates by mixing the corresponding sulfide ores (ZnS, CuS, CdS, FeS) with ammonium sulfate and heating in a nonoxidizing atmosphere to convert the mixture to the metallic sulfate, ammonia, sulfur and sulfur dioxide.

Reinhardt, et al. (U.S. Pat. No. 4,053,553) recover Cd from nickel-cadmium battery waste by a process that includes the steps of leaching the waste with an ammoniacal carbonate solution to form a solution containing Cd, Ni, and Co(II) ammine complexes, and precipitating the Cd as a carbonate by removing ammonia from the solution. Hadzeriga (U.S. Pat. No. 3,853,941), Schulte-Schrepping, et al. (U.S. Pat. No. 3,721,729), George (U.S. Pat. No. 3,258,307) and Waring (U.S. Pat. No. 1,780,323) precipitate $CdCO_3$ from an aqueous solution by adding ammonium carbonate to the solution; Schaufelberger (U.S. Pat. No. 2,837,406) adds ammonia and an ammonium salt to a leach liquor to form a soluble metal polyammine salt complex, recovers the complex, and calcines to recover the metal oxide. Thwaites (U.S. Pat. No. 921,312) forms CdS by adding finely-powdered ZnO to iron-sulfate-containing "pyrites liquor." The ZnO reacts with the sulfates to form iron oxides and $ZnSO_4$. The precipitate is removed by filtration, and a soluble sulfide or sulfureted hydrogen is added to the remaining liquor to precipitate CdS. However, none of these processes is useful for recovering cadmium from cadmium-bearing scrap metals.

There is a need for a safe, effective process for recovering cadmium from cadmium-bearing waste metals, preferably without attacking any other metals present. Such a process would permit easier waste disposal, safer recycling of used materials, and the separation of much "mixed" nuclear waste into separate fractions which could then be handled according to well-established and nonconflicting regulations. Preferably, such a process would turn the cadmium into a stable, compact and insoluble form which either could be reused or, by meeting T.C.L.P. limits, could be discarded as nonhazardous. The stabilized cadmium product should be free of impurities, especially those from nuclear scrap which could be reasonably expected to carry radioactivity.

SUMMARY OF THE INVENTION

According to its major aspects and broadly stated, the present invention is a process for recovery of a metal, in particular, cadmium contained in scrap, in a stable form. The process comprises the steps of:

shredding, dividing, or breaking up the scrap, if necessary, to expose additional surface area and, in particular, hidden or enclosed bodies containing cadmium material;

mixing the cadmium-containing scrap with an ammonium carbonate solution containing, preferably, at least a stoichiometric amount of ammonium carbonate, or more preferably also an excess of ammonia, plus an oxidizing agent, to form a first mixture so that the cadmium will react with the ammonium carbonate and ammonia to form a water-soluble ammine complex;

evaporating the first mixture so that ammine complex dissociates from the first mixture leaving carbonate ions to react with the cadmium and form a second mixture that includes cadmium carbonate but is free of ammonia;

optionally, adding water to the second mixture to form a third mixture;

adjusting the pH of the third mixture to the acid range whereby the cadmium carbonate will dissolve;

adding at least a stoichiometric amount of sulfide, preferably in the form of hydrogen sulfide or an aqueous ammonium sulfide solution, to the third mixture to precipitate cadmium sulfide. This fourth mixture of sulfide is preferably digested by heating and separated by filtration; and mixing the precipitated cadmium sulfide with glass formers and vitrifying to create a low-leachability form suitable for permanent disposal as a non-hazardous substance.

The detoxification of the cadmium is an important advantage of the present process. By detoxifying the cadmium, it does not have to meet disposal requirements for hazardous waste and is safely disposed of, unless radioactive, in which case it need only meet radioactive waste disposal requirements and will eventually decay radioactively until no longer hazardous from this standpoint.

The use of recyclable reagents (ammonia, carbon dioxide, oxygen) is an important feature of the present invention. Not only does this provide the opportunity to reduce the amount of waste generated in the recovery of a valuable metal but it can also simplify adaptation of the present process to a production facility.

Another feature of the present process is the form of the cadmium compound at the end of the process. The end product, cadmium sulfide can be reused without further chemical processing or disposed of after the further step of vitrification.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a flow chart of a process for recovering cadmium from cadmium-containing metals according to a preferred embodiment of the present invention; and FIG. 2 is a schematic view of an apparatus for carrying out the process of FIG. 1.

DETAILED DESCRIPTION OF A PREFERRED EMBODIMENT

Referring now to FIG. 1, there is shown a flow chart of a process for recovering cadmium from cadmium-bearing scrap metals. The process includes the following steps:

1. Breaking up the scrap metals, by shredding, grinding or the like.

No shredding is needed for geometrically simple cadmium-plated objects, since all the cadmium is on the exposed surfaces. More complex items, including nickel-cadmium batteries and most nuclear scrap materials, may need to be broken up so that the cadmium is exposed at the surface. Cadmium alloys, such as Wood's metal, relay contact alloys and solders, should be reduced to fine powders or dissolved separately using appropriate acids or other suitable reagents.

2. Leaching the shredded scrap with a hot, aqueous solution of ammonia and/or an ammonium salt, preferably ammonium carbonate, plus an oxidizing agent, to form a first mixture that contains a water-soluble tetrammine complex of cadmium. Alteratively, a quantity of water is added to the scrap, and ammonia, carbon dioxide, and an oxidizing agent such as oxygen are bubbled through the mixture.

3. Evaporating the first mixture to remove ammonium compounds and ammonia, leaving a concentrate of cadmium carbonate.

4. Adding clean water and adjusting the pH to the acid range to dissolve the cadmium carbonate.

5. Adding a soluble sulfide to precipitate the cadmium in the form of cadmium sulfide.

6. Removing excess soluble sulfide and any other soluble materials which may be present, and recovering the cadmium sulfide.

7. Drying the cadmium sulfide. The cadmium sulfide may be used in dry form, for example, for making photoconductive cells.

8. Alternatively, the sulfide may be fused with a low-melting-point glass flit, preferably in the absence of air, to form a solid mass. With the sulfide wetted and enclosed by glass, only a few cadmium sulfide particles at a time are accessible to leaching. The sulfide may then be discarded as a nonhazardous waste.

A suitable leachant for use in Step 2 is rich in ammonia or an ammonium compound, and contains an oxidant or oxidizing agent. To minimize waste generation, the cadmium should be left in the form of a nonvolatile, water-insoluble solid, and all reagents should be easy to separate from the cadmium and recover for re-use.

It is known that a hot, concentrated solution of ammonium nitrate will attack and dissolve cadmium without affecting most other metals. After dissolution, excess ammonium nitrate can be removed by heating to between 200°–260° C. to decompose the ammonium nitrate into water and nitrous oxide:

$$NH_4NO_3 \rightarrow 2H_2O + N_2O$$

At temperatures above 260° C. or when certain impurities, especially oxidizable impurities, are present, ammonium nitrate can decompose by a second pathway to form water, nitrogen and oxygen:

$$2NH_4NO_3 \rightarrow 4H_2O + 2N_2 + O_2$$

Once this reaction is started, it reaction proceeds at a rapidly accelerating pace, often leading to detonation. As a result, ammonium nitrate is not the optimum material for use in the process.

Of readily-available ammonium salts, ammonium bicarbonate is stable at room temperature, very soluble in water, and decomposes smoothly to gaseous carbon dioxide, water and ammonia when heated to approximately 60° C. No alternate decomposition pathway is known. On cooling, the gases recombine to form ammonium bicarbonate:

$$NH_4HCO_3 \leftrightarrow CO_2 + H_2O + NH_3$$

Ammonium carbonate ($(NH_4)_2CO_3$) is also suitable for use with the invention. Ammonium carbonate decomposes to form ammonium bicarbonate (which decomposes in turn to carbon dioxide, water and ammonia) and ammonia as follows:

$$(NH_4)_2CO_3 \rightarrow NH_4HCO_3 + NH_3$$

As a result, the reagents not only can be removed easily from the cadmium tetrammine salt by simple, low-temperature distillation, but can be recovered and reused. Continuing this process will also dissociate the tetrammine complex, freeing its ammonia. Cadmium precipitates as the highly soluble carbonate. All ammonia and all carbon dioxide, save for that used in forming the precipitate, may be recovered and reused in Step 2.

While ammonium bicarbonate has no oxidizing power of its own, a supplementary oxidizing agent may be added in the form of hydrogen peroxide or as elemental oxygen dissolved under pressure in the leaching solution (Step 2). Hydrogen peroxide can be removed at low temperatures after dissolution of the cadmium. Alternatively, dissolved oxygen can be used so that all reactants are in the form of recirculating gases.

In a test of the invention, a leachant was made by letting 3% hydrogen peroxide stand over solid ammonium carbonate until saturated, decanting, then adding an equal volume of approximately 29% aqueous ammonia. Cadmium-plated steel screws, shredded cadmium sheet, and chemically-pure, so-called "mossy" cadmium were leached successfully using this solution.

Preferably, the shredded cadmium-containing metal may be placed in a vessel holding concentrated ammonium bicarbonate solution and the oxidizing agent at about 50 degrees Celsius, and agitated. Alternatively, a solution of ammonium carbonate, or a solution containing both ammonium carbonate and ammonium bicarbonate, may be used. Periodically, the liquid is drained off and tested for cadmium by adding a small amount of soluble sulfide, preferably ammonium hydrosulfide, $NH_4HS$. The presence of more than about one part per million of cadmium will cause a visible, bright yellow precipitate of cadmium sulfide to form. The process is repeated with fresh batches of liquid until the liquid tests negative for cadmium.

All liquid batches are combined in a large vessel and boiled down, recovering the carbon dioxide, steam and ammonia for re-use. Since hydrogen peroxide has a high boiling point (150° C.), it tends to accumulate and be concentrated in the boiling vessel, and could decompose violently. Cadmium and its salts, however, act as catalysts which will decompose any excess.

For added safety, a supplementary catalyst may be added. A promising catalyst for this purpose is Lefort's magnetite, a colloidal iron oxide of the approximate composition $Fe_3O_4H_2O$, prepared by adding an alkali-metal hydroxide solution to a mixed solution of ferrous and ferric sulfates in 1:2 atomic ratio. This material has an advantage over better-known solid catalysts, such as manganese dioxide, in that it is ferromagnetic and thus can be removed almost completely from the solution after use by a magnet or external magnetic field. Other ferromagnetic materials may also be suitable.

As soon as all or most of the cadmium has been removed from the scrap (as indicated by the above-described sulfide test), and the excess peroxide has been decomposed, the solution may be boiled down until ammonia and carbon dioxide cease to be evolved, and the gases recovered for reuse.

As an alternative to using hydrogen peroxide, the leaching solution is preferably saturated with dissolved oxygen, for instance, by bubbling oxygen upward through the leaching chamber in opposition to the downward flow of leachant. Oxygen reaching the surface is collected and sent through again; only that actually consumed in oxidizing the cadmium would need to be replenished. Once all cadmium has been removed from the waste metals, the solution is boiled until ammonia and carbon dioxide cease to be evolved. The gases are collected, may be recombined to form ammonium bicarbonate, and kept for reuse.

With the cadmium removed, the remaining metal scrap can be either reprocessed and reused, or discarded as essentially nontoxic. While radioactivity may remain in some nuclear scrap, the material—unless it also contains lead, mercury or another listed toxin—will no longer be "mixed waste" and can therefore be disposed of more easily.

At this point, the solution consists only of water, dissolved tetrammine salts, and any sulfide which was precipitated in testing the completeness of dissolution. It should be pointed out that this separation procedure is not specific for cadmium, but will remove from the scrap (or its exposed surfaces) any of the transition metals which form water-soluble and thermally stable ammine complexes at moderately high pH levels. Other metals of which this is true are copper, zinc, nickel, chromium, cobalt, iridium, platinum, palladium and silver. Mercury does not follow this scheme because the ammonium ion reduces it to the insoluble free metal.

When the boiling solution has ceased to give off ammonia and carbon dioxide, it is cooled and preferably removed (including any precipitate) to a second vessel, where the precipitated cadmium carbonate is redissolved at a lower pH and ammonium hydrosulfide is then added. This reprecipitates the cadmium as the insoluble sulfide which is then filtered out. Prolonged heating near the boiling point ("digestion") before filtration will cause larger particles to grow at the expense of smaller ones, rendering the sulfide into large, easily-filtered particles. The remaining liquid may then be boiled down, separating out the ammonia and hydrogen sulfide for recycling, or may simply be reused as-is with following batches of cadmium-bearing leach liquid.

The filtered-out material should be tested both for purity (i.e., percent of cadmium present in relation to other metals such as zinc and copper) and, in the case of nuclear scrap, for radioactivity. If it is found to be non-radioactive and of sufficient purity, it may be desirable to offer the material for sale on the open market. If not, one further processing step will prepare it for safe disposal in a compact form as a nonhazardous or, at worst, as a radioactive but nontoxic material. This step, conversion to a glassy solid by fusion with a suitable frit, is discussed below.

Referring now to FIG. 2, there is shown an apparatus 10 suitable for use with the present invention. Apparatus 10, a modification of a Soxhlet-type evaporator, is suitable for industrial-scale recovery of cadmium using the above-described process. Soxhlet extractors are used in various chemical and biochemical extraction processes, for example, in isolating alkaloids from plant material. In a Soxhlet extractor, a solvent boils in a lower flask; its vapors are recondensed at the top and flow down into a central extraction chamber, where the source material is held in a porous thimble. When the liquid level nears the top of the extraction chamber, a siphon tube flushes the recondensed liquid back into the lower flask and the cycle begins anew. As a result, the source material is repeatedly exposed to fresh solvent, while the extracted material is concentrated in the lower flask.

Apparatus 10 includes an extraction chamber 12 with a porous plate 14, a lower chamber 16, a condenser 18, a conduit 20 and a pump 22. A quantity of metal scrap 28 to be treated is placed in chamber 12, where it rests on plate 14. Carbon dioxide, ammonia and oxygen are injected into chamber 12 via conduit 20, entering the chamber just below plate 14. Lower chamber 16 contains a quantity of water 30. When water 30 is boiled, steam rises, mixes with the gases in a conduit 32 connecting chambers 12 and 16, is recondensed in chamber 12 and falls into the chamber to surround metal scrap 28. Uncondensed gases are recirculated by pump 22 and bubble up again through the liquid and scrap 28 in chamber 12.

When chamber 12 is filled with liquid, a siphon tube 34 spills over and quickly flushes the liquid back into lower chamber 16. This liquid carries with it any leached-out cadmium from scrap 28. A diverter valve 36 at the base of chamber 12 allows sampling of the liquid for analysis, if desired. Cadmium is readily detected by precipitation as the white, uncomplexed carbonate or the yellow sulfide, by atomic-absorption spectrophotometry or some other convenient technique.

After a number of such flush cycles, all leachable cadmium has been removed from scrap 28 and none is detectable in the leachant. At this point, a valve 40 is opened and the recondensed liquid is drained away. This liquid holds dissolved reagent gases and may be reused.

Heating the contents of chamber 12 both concentrates the liquid remaining there, holding the extracted cadmium, and drives off the dissolved gases and complexing ammonia. The result is a mixture or "mush" of water and uncomplexed, solid cadmium carbonate. When this second mixture is sufficiently concentrated, heating stops, an acid is added to redissolve the carbonate, and the resulting solution is drained off.

With the cadmium removed, the remaining metal scrap can be either reprocessed and reused, or discarded as essentially nontoxic. While some nuclear scrap may retain radioactive materials, the material —unless it also contains lead, mercury or another listed toxin—will no longer be classified as mixed waste.

At this point, the drained-off solution consists only of water, dissolved metal salts, and a small amount of residual acid. The salts may include cadmium salts, and, depending on the constituents of scrap 28, other transition metal salts. The leachant will remove from the scrap any other transition metals which form water-soluble ammine complexes, including copper, zinc, nickel, chromium, cobalt, iridium, platinum, palladium and silver. Colloidal ferric hydroxide, derived from rusted carbon steel, may also be present. The residue of scrap 28 contains nondissolved metals such as aluminum and stainless steel.

When precious metals, or radioactive metals such as cobalt-60 or nickel-63, are present in scrap 28, the solution may be further treated to remove or recover them. For example, since most of these metals are more noble than cadmium, they may be removed by selective electrodeposition.

After removal from apparatus 10, the solution is saturated with a soluble sulfide, either by bubbling in hydrogen sulfide gas or by adding solid ammonium hydrosulfide or a water solution thereof while maintaining a slightly acid pH. The pH is adjusted by adding a sufficient quantity of nitric acid, hydrochloric acid or sulfuric acid to maintain the pH in the acid range (i.e., less than 7.0). However, other acids such as acetic acid may also be suitable for use with the invention. The dissolved cadmium is precipitated in the form of cadmium sulfide:

$$Cd^{2+} + S^{2-} \rightarrow CdS \downarrow$$

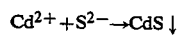

Preferably, the solution should be freed of all possible ammonia and oxidizing capability before addition of the sulfide. Sulfide is unable to decompose or precipitate cadmium tetrammine, so cadmium which still exists in the complex form will not precipitate. Also, if an oxidizer such as hydrogen peroxide is still present, elemental sulfur may slowly precipitate out and interfere with later separation steps.

Once precipitated, the cadmium sulfide may simply be filtered out. Preferably, the sulfide-containing mixture is held near its boiling point (i.e., digested) before filtration, causing larger CdS particles to form at the expense of smaller particles. The CdS filter cake may be dried by heating, preferably at approximately 60° C. Uncombined sulfide can be recovered from the remaining liquid, the vapors released during digestion and those from drying, and reused.

The above-described process has the advantages, both economic and environmental, of using mainly volatile reagents: either gaseous, readily decomposed into gases by heat, or easily boiled off and recondensed. Only the scrap metals being treated, the cadmium sulfide produced, and the acid used to redissolve the precipitated carbonate, are nonvolatile. Hence, unconsumed reagents are easily separated from the treated scrap and sulfide waste for reuse. This fact gives the process a significant advantage for use with radioactive scrap metal, in that no waste streams need be generated apart from the sulfide itself and thus there is little chance of radioactive materials escaping from the process. Even if excess gas is vented to the outside—whether as part of the process or as the result of an accidental release—it is unlikely to carry radioactive contamination.

As noted above, cadmium sulfide occurs naturally in hydrothermal deposits. However, CdS has very low solubility in water at room temperature: on the order of 1.3 parts per million.

Cadmium sulfide oxidizes in air if heated above 400° C., forming toxic fumes:

$$2CdS + 3O_2 \rightarrow CdO + SO_2 \uparrow$$

When heated in the absence of oxygen, however, CdS is stable up to 980° C., where it sublimes at normal pressure. At 100 atmospheres pressure it remains solid up to 1750° C., then melts without decomposing. Sufficiently pure CdS may be used in the manufacture of photoconductive cells, thin-film photovoltaic cells, and light-emitting diodes and solid-state lasers. Another market exists in the area of paints and pigments. CdS and its various modifications are used as pigments, collectively termed "cadmium yellows."

Alternatively, CdS can be mixed with a suitable glass frit and heated under an inert gas. The CdS is wetted by the hot molten glass and then, at around 1500° C., wholly dissolved in the glass. On slow cooling, the CdS reprecipitates to form a vast number of tiny hexagonal crystals which remain suspended in the glass. Although almost any silicate composition will dissolve and hold the cadmium, lead-bearing frits have traditionally been used since they are low-melting and yield the most vivid colors.

The CdS is strongly wetted by the glass matrix, thus, fused surfaces expose little or no CdS to the atmosphere. Once encased by glass, the CdS is protected from chemical attack or dissolution. Subsequent remelting of the glass may therefore be carried out in air without noticeable effect on the crystals.

Glasses pigmented with cadmium yellows may be formed directly into decorative objects, and also reground to make vitreous enamels and fused onto metal in a thin, continuous layer for decoration and protection from corrosion.

CdS produced by the above-described process, if nonradioactive, may be used for these applications. Alternatively, fusion into a glassy matrix renders it suitable for safe disposal in a compact form, as a nonhazardous or radioactive but nontoxic material.

It will be apparent to those skilled in the art that many changes and substitutions can be made to the preferred embodiment herein described without departing from the spirit and scope of the present invention as defined by the appended claims.

What is claimed is:

1. A process for stabilizing a metal that is a constituent of waste materials, said process comprising the steps of:
   mixing said waste materials with an ammonium carbonate solution and an oxidizing agent to form a first mixture, said metal reacting with said ammonium carbonate to form a water-soluble ammine complex;
   evaporating said first mixture to form a second mixture, said ammine complex dissociating from said first mixture leaving carbonate ions to react with said metal in said second mixture to form a metal carbonate;
   adjusting the pH of said second mixture to the acid range so that said metal carbonate dissolves, forming a third mixture; and
   adding a sulfide to said third mixture to form a fourth mixture, said sulfide reacting with said dissolved metal carbonate to form an insoluble sulfide of said metal for recovery.

2. The process as recited in claim 1, wherein said mixing step further comprises mixing at least a stoichiometric amount of said ammonium carbonate solution with said waste materials.

3. The process as recited in claim 1, wherein said sulfide-adding step further comprises adding at least a stoichiometric amount of said sulfide to said third mixture.

4. The process as recited in claim 1, further comprising the step of adding water to said second mixture.

5. The process as recited in claim 1, further comprising the step of digesting said fourth mixture.

6. The process as recited in claim 1, further comprising the step of heating said first mixture.

7. The process as recited in claim 1, further comprising the step of shredding said waste materials before said mixing step.

8. The process as recited in claim 1, further comprising the steps of:
   mixing said metal sulfide with glass formers to form a fifth mixture; and
   vitrifying said fifth mixture.

9. A process for recovering cadmium from waste materials, said process comprising the steps of:
   mixing said waste materials with ammonia, carbon dioxide and an oxidizing agent to form a first mixture, said first mixture having a pH in the basic range, so that said cadmium reacts with said ammonia to form a water-soluble ammine complex;
   evaporating said first mixture to dissociate said ammine complex, so that said cadmium reacts with said carbon dioxide to form a second mixture containing a carbonate of said cadmium;
   adjusting the pH of said second mixture to the acid range so that said cadmium carbonate dissolves, forming a third mixture; and adding a sulfide to said third mixture to form a fourth mixture, said sulfide reacting with said dissolved cadmium carbonate to form an insoluble sulfide of said cadmium.

10. The process as recited in claim 9, wherein said mixing step further comprises adding a sufficient quantity of said ammonia so that said first mixture contains at least approximately 4 moles ammonia per mole of cadmium.

11. The process as recited in claim 9, wherein said sulfide-mixing step further comprises saturating said third mixture with said sulfide.

12. The process as recited in claim 9, further comprising the step of adding water to said second mixture.

13. The process as recited in claim 9, wherein said mixing step further comprises adding an aqueous ammonium salt solution to said waste materials, said process further comprising the step of heating said first mixture to a temperature of at least approximately 40° C.

14. The process as recited in claim 9, further comprising the step of digesting said fourth mixture before separating said cadmium sulfide therefrom.

15. The process as recited in claim 9, further comprising the steps of:

mixing said cadmium sulfide with glass formers to form a fifth mixture; and vitrifying said fifth mixture.

* * * * *